SINGLE SIDEBAND SPACE-FREQUENCY DIVERSITY TRANSMISSION SYSTEM

Filed Dec. 29, 1961 2 Sheets-Sheet 1

INVENTORS J. D. FOULKES
W. D. LEWIS
N. D. NEWBY
BY [signature]
ATTORNEY

INVENTORS J. D. FOULKES
W. D. LEWIS
N. D. NEWBY
BY [signature]
ATTORNEY

United States Patent Office 3,125,724

Patented Mar. 17, 1964

3,125,724

SINGLE SIDEBAND SPACE-FREQUENCY DIVERSITY TRANSMISSION SYSTEM

John D. Foulkes, Mountain Lakes, Willard D. Lewis, Little Silver, and Neal D. Newby, Leonia, N.J., assignors to Bell Telephone Laboratories, Incorporated, New York, N.Y., a corporation of New York Filed Dec. 29, 1961, Ser. No. 163,236

9 Claims. (Cl. 325—154)

This invention relates to a radio transmission system and more particularly to a space diversity radio transmission system.

In communication systems utilizing the propagation of short wave signal energy to convey information between the transmitting and receiving terminals of the system, an effect commonly known as fading is encountered. This effect is manifested by variations in the strength of the received radio signal. Many theories have been expounded relating to the cause of the aforementioned phenomenon. For one type of fading the theory gaining the widest acceptance attributes the discontinuities in the transmitting medium which cause reflections of the propagated waveform as the basis of the trouble. The reflected wave will either augment or reduce the amplitude of the original wave depending upon the phase relationship between the two waves. Consequently, the composite waveform will be a series of peaks and nulls. Thus, if the receiver is geographically located at a point in space wherein a null occurs, no signal energy will be received.

A number of techniques tending to alleviate the problem of fading are now in use. Basically the solutions include either frequency or space diversity transmission of the signal energy. Another form of system which combats selective fading involves diversity reception wherein two or more receivers are employed in combination with a single transmitter. However, each diversity system has a major disadvantage associated with it as will become more apparent from the following descriptions of both types of systems.

The frequency diversity system is based upon the statistical fact that fading will not be exhibited at two different frequencies at the same instant. Thus, the basic frequency diversity transmission system is characterized by the transmission of the same signal, or baseband information, as modulation upon two carrier signals of different frequencies. If fading occurs at one carrier frequency, the other carrier signal will still be received. It is obvious, therefore, that the receiving equipment must include elements which are capable of receiving both carrier frequencies and elements which are capable of determining which carrier signal is stronger in addition to the normal circuit elements which demodulate the carrier to retrieve the information signal. Likewise the transmitter must include equipment for the generation of two carrier signals and must further include means for modulating each carrier with the same information signal.

The space diversity system is based upon the known fact that if two identical signals are transmitted to a single destination from two geographically separated sources, the statistical likelihood of both signals fading simultaneously is small. This fact can be accounted for by considering that the variations in the transmission medium of the path each signal traverses to reach the receiver will be different. Thus, in the basic space diversity transmission system two signals, at the same carrier frequency and carrying the same signal information, are transmitted from, or are received by, multiple antennas geographically separated from one another. The major disadvantage associated with such a system lies in the fact that the two signals received may differ from one another in their phase relationship since each signal traverses a different path between the transmitting and receiving antennas. Hence, portions of the waveforms will reinforce one another while other portions will subtract from one another thereby causing the received signal to be distorted as explained hereinbelow.

Accordingly, an object of the present invention is to eliminate the possibility of multipath interference between the received signals in a space diversity radio transmission system.

Another object of the present invention is to provide a space diversity transmission system for use in radio telephone communications which is compatible with the majority of systems now in use.

The present invention involves a transmission system wherein the audio information signal is filtered by a number of filters having staggered stop and pass bands such as comb filters. The outputs of the comb filters are then used respectively to amplitude modulate carrier signals of the same frequency and the resultant amplitude-modulated carrier signals are transmitted from a number of geographically displaced antennas utilizing single sideband transmission techniques. Since the modulating frequencies applied to the carriers are different, the resultant single sideband signals propagated from the transmission antennas will not encompass the same range of frequencies and therefore multipath interference between the transmitted signals will be eliminated.

The invention is described herein as embodied in a mobile radio telephone transmission system. The invention is peculiarly adapted and can be most advantageously used in such a type of communication system since the resultant system will be compatible with most radio telephone communication systems now in use. Although two transmitting stations are shown, the invention is not to be thought of as limited to this number.

It is believed that the system of the present invention may be better understood by a brief examination of the human auditory response to speech signals. It is a well-known fact that different discrete frequencies in the audio spectrum may be relatively attenuated up to 40 db by normal room acoustics and the speech will still be intelligible. The explanation of this phenomenon apparently rests upon the basis that the absence of a particular frequency in a band of frequencies is not critical to the total understanding of any group of signals. Thus, if several bands in the audio spectrum, each representative of a major frequency region, are transmitted to the receiving equipment, the resultant audio signal will still be intelligible to the listener despite the absence of any signal energy in other portions of the spectrum.

The above and other features of the invention will be more clearly understood following a consideration of the following detailed description taken in connection with the drawings wherein.

It is believed that a more thorough discussion of prior art space diversity transmission systems may be helpful in fully understanding and appreciating the present invention. It is a well known fact that a carrier signal which is amplitude modulated by a sine wave may be represented by the formula $$e=E_0 \sin 2\pi ft+\frac{mE_0}{2} \cos 2\pi(f-f_s)t-\frac{mE_0}{2} \cos 2\pi(f+f_s)t \quad (1)$$

where $e$ is the instantaneous value of the carrier wave;
$E_0$ represents the average amplitude;
$f_s$ represents the modulating frequency;
$f$ represents the carrier frequency; and
$m$ represents the ratio of amplitude variation from the average to the average amplitude.

(The derivation of this formula may be seen by reference to Electronic and Radio Engineering by F. E. Terman, 4th Edition, McGraw-Hill, 1955, at page 7). In single sideband transmission only one sideband will be transmitted and therefore may be represented by the formula $$e=\frac{mE_0}{2} \cos 2\pi(f-f_s)t \quad (2)$$

If the sideband signal is transmitted from two geographically spaced antennas, the above Formula 2 is representative of the signal being propagated from either antenna. If the carrier frequency ($f$) is the same and the modulating frequency ($f_s$) associated with each antenna is identical, it is obvious the two transmitted sidebands will be the same.

Figure 1:
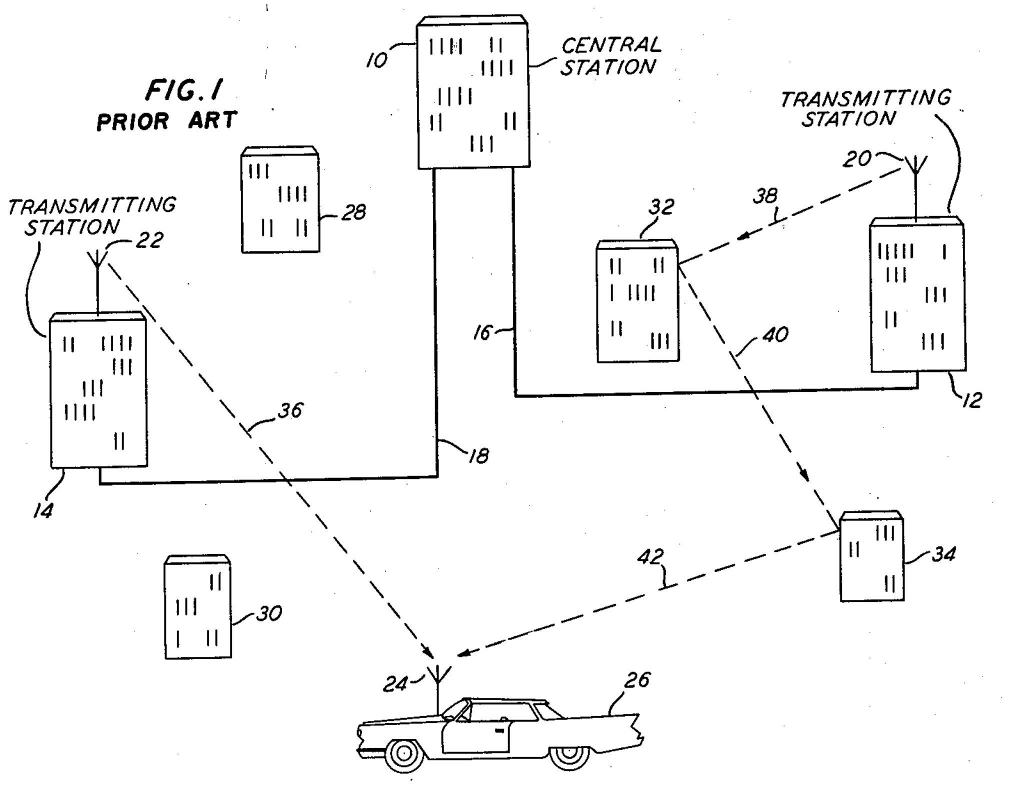
FIG. 1 is a diagrammatic representation of a prior art space diversity transmission system used in a mobile radio system.

FIG. 1 depicts a prior art diversity transmission system which comprises, in part, a central office 10. The audio information signal originates at this station and is modulated upon the carrier signal at the transmitting stations 12 and 14 to which it is conducted over the leads 16 and 18, respectively. The signal energy is thereupon transmitted from the transmitting antennas 20 and 22, associated with stations 12 and 14, respectively, to a receiving antenna 24 associated with a mobile subscriber 26. The environment surrounding the transmitting station and the mobile subscriber may include, for example, the buildings 28, 30, 32 and 34. Since the location of a mobile subscriber is constantly changing, at any one instant the signal propagated from antenna 22 may traverse the path indicated by the broken line 36 to the antenna 24. The signal propagated from antenna 20 may traverse the path indicated by the broken line 38, impinge upon and be reflected from building 32, traverse the route indicated by the broken line 40, impinge upon and be reflected from building 34, and traverse the route indicated by the broken line 42 to receiving antenna 24.

Figure 2:
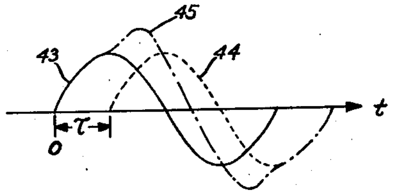
FIG. 2 is a graph of the waveforms in the prior art space diversity transmission systems.

If it is assumed, for illustrative purposes, a pure sine wave is transmitted from the transmitting antennas, the signals transmitted from antennas 22 and 20 will have the shape of waveforms 43 and 44, respectively, as shown in FIG. 2. Waveform 43 will arrive at antenna 24 at a time corresponding to "0" time in FIG. 2. However, due to the fact waveform 44 has been delayed somewhat because of the longer path the wave had to traverse to reach antenna 24, the waveform may be delayed by a time $\tau$ before reaching receiving antenna 24. These waveforms, 43 and 44, will therefore add and subtract since they are the same frequency thus producing a resultant wave indicated by waveform 45 in FIG. 2. It is to be noted that due to interference, the amplitude of waveform 45 is different from that of either signal. If the delay $\tau$ corresponded to a half cycle (i.e., 180° phase shift) it is obvious waveforms 43 and 44 would cancel one another and on signal energy would reach the mobile receiver. This illustrates the inherent disadvantage of the prior art space diversity transmission systems.

In accordance with the above noted theory, if the modulating frequency $f_s$ associated with each transmitting station is different, the frequency of the resultant sidebands will not be equal. If arbitrary limits are prescribed for the frequencies of the modulating signals such that the modulating frequencies associated with the respective transmitting stations do not overlap, the result will be the transmission of single sideband signals from each transmitting station which will be of different instantaneous frequencies and therefore canont cause the multipath interference noted hereinabove in conjunction with the prior art system.

Figure 3:
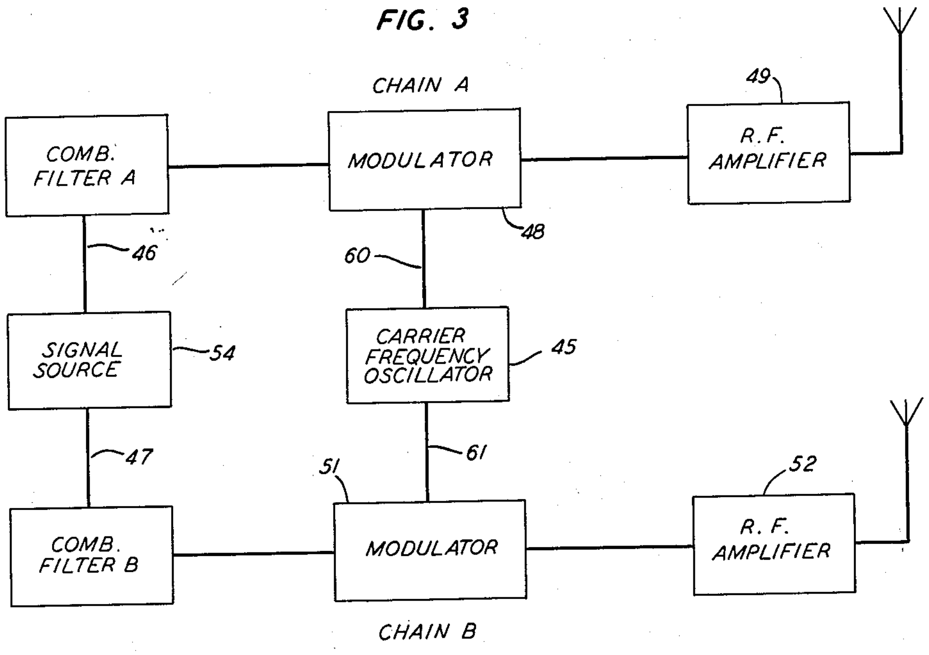
FIG. 3 is a block circuit diagram of the space diversity transmission system of the present invention.

In accordance with this theory, FIG. 3 depicts a system which will accomplish this result. The information to be transmitted originates in signal source 54 and is applied to the two chains A and B by the leads 46 and 47, respectively. Serially connected in chain A are a comb filter A, an amplitude modulator 48, and an RF amplifier 49, the output of which is connected to a transmitting antenna. Serially connected in chain B are a comb filter B, an amplitude modulator 51, and an RF amplifier 52, the output of which is connected to a second transmitting antenna. The carrier frequency originates in an oscillator 45 and is applied to modulators 48 and 51 by the leads 60 and 61, respectively. If two carrier frequency oscillators (of the same frequency) are used then one oscillator, modulator, and amplifier may be contained in a transmitting station such as station 12 in FIG. 1 and the other oscillator, modulator, and amplifier may be contained in a transmitting station such as station 14 in FIG. 1. The source 54 and the attendant comb filters may be contained in a control station such as station 10 in FIG. 1. Modulators 48 and 51 may be any of the types of single sideband amplitude modulators now in use and well-known in the art. Likewise, amplifiers 49 and 52 may be any of the RF amplifiers well known in the art.

Figure 6A:
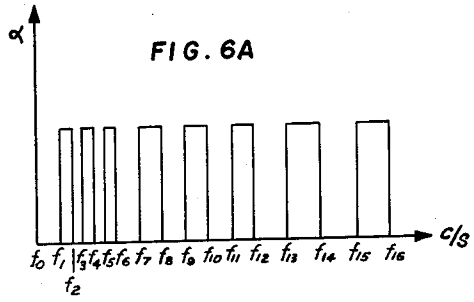
FIGS. 6A and 6B are graphs of the attenuation characteristics as a function of frequency for attenuation of the signals on an octive scale.
Figure 6B:
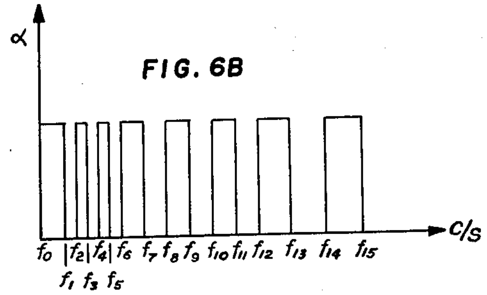
Figure 4A:
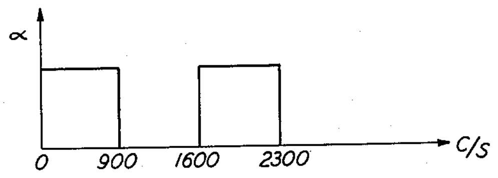
FIGS. 4A and 4B are graphs of the ideal attenuation characteristics as a function of frequency of the comb filters shown in FIG. 3.
Figure 4B:
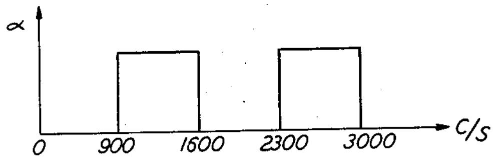

Comb filters A and B have staggered attenuation bands each of which are representative of an important group of frequencies in the audio range. The attenuation characteristics of comb filter A of FIG. 3 are shown in FIG. 4A as a function of frequency and may encompass the frequencies ranging from 0 to 900 cycles per second and from 1600 to 2300 cycles per second. The attenuation characteristics of comb filter B, as shown in FIG. 4B as function of frequency may encompass the bands of frequencies from 900 to 1600 and from 2300 to 3000 cycles per second. It is to be noted that the frequencies cited are for illustrative purposes only. Actually there may be many more attenuation bands than those shown and the bands at the lower limit of frequencies may be placed closer together than the bands at the higher end of the audio frequency spectrum (as shown in FIGS. 6A and 6B) since the ear detects sound on an octive scale rather than an arithmetic scale. Furthermore, the invention is not to be thought of as limited to comb filters as any filter having the desired characteristics will do.

Figure 5:
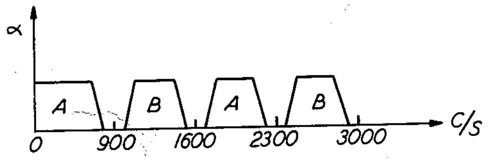
FIG. 5 is a graph of the actual attenuation characteristics as a function of frequency of the comb filters shown in FIG. 3.

It is to be further noted that the attenuation characteristics shown in FIGS. 4A and 4B are ideal. The actual characteristics of the filters may take the shape shown in FIG. 5 wherein the letter A represents those attenuation bands associated with comb filter A and the letter B represents those attenuation bands associated with comb filter B. A comparison between FIGS. 4A and 4B and FIG. 5 will show that the boundary frequencies (i.e., 900, 1600, 2300, and 3000 cycles per second) are not encompassed within any of the attenuation bands and therefore these frequencies will be present in both chain A and chain B. In the absence of interference, such an overlap of the pass bands will permit the transmission of the voice spectrum without the loss of any frequencies albeit filters having less than ideal characteristics are used.

If it is assumed, for purposes of illustrating the present invention, that the attenuation characteristics of the filters are as shown in FIG. 4A and FIG. 4B, all audio frequencies falling within the range of 900 to 1600 and 2300 to 3000 cycles will not be attenuated by filter A and will thus modulate the carrier associated with chain A in modulator 48. The information will then be propagated, via single sideband transmission, from station 14. The audio frequencies falling within the range of 0 to 900 and 1600 to 2300 cycles will not be attenuated by filter B and will thus modulate the carrier signal associated with chain B in modulator 51. This signal will then be propagated, via single sideband transmission, from station 12.

If one of the transmitted signals is subject to fading, the signal which does reach the mobile subscriber will still contain a sufficient amount of information as to render the demodulated speech signal intelligible in accordance with the hereinabove stated fact that portions of the audio spectrum of frequencies may be attenuated without impairing the understanding of the resultant speech. Furthermore, the inherent disadvantage of transmitting two waveforms of the same frequency associated with prior space diversity transmission systems is completely eliminated in the present system as the signals transmitted from the antennas will not coincide in instantaneous frequency.

What is claimed is:

1. In a space diversity radio communication system comprising a plurality of transmission means for the transmission of signal energy, first means for generating a carrier signal, a plurality of amplitude modulators, means connecting respective ones of said plurality of amplitude modulators to individual ones of said plurality of transmission means, means connecting said first means to each of said amplitude modulators, a second means for generating signal information, a plurality of filter means for passing discrete portions of the frequency spectrum of said information signal, each of said filter means passing different portions and the sum of the portion passed by each containing sufficient frequencies in the spectrum to produce an intelligible signal, means connecting respective ones of said plurality of filter means individually to respective ones of said plurality of amplitude modulators and to said second signal generating means.

2. In a space diversity single sideband radio telephone transmission system having a plurality of antennas for the propagation of a suppressed carrier single sideband amplitude modulated signal, means for generating a carrier signal, a plurality of amplitude modulators, means connecting said carrier generating means to each of said plurality of amplitude modulators, means connecting respective ones of said plurality of amplitude modulators to respective ones of said plurality of antennas, a source of audio frequency signal information, a plurality of filter means for passing discrete portions of the audio spectrum, each of said filter means passing different portions and the sum of the portion passed by each containing sufficient frequencies in the audio spectrum to produce an intelligible signal, and means connecting respective ones of said filter means individually to respective ones of said plurality of amplitude modulators and to said audio source.

3. A system as defined in claim 2 wherein said plurality of filter means each have alternating pass bands through the audio frequency spectrum, the bands of the several filters falling adjacent to one another through said spectrum.

4. In a suppressed carrier single sideband communication system having a plurality of spacially displaced propagating means, means for generating a carrier signal, a plurality of amplitude modulators, means connecting the carrier generating means to said plurality of amplitude modulators, a plurality of means for the amplification of a suppressed carrier single sideband amplitude modulated signal, means connecting respective ones of said plurality of amplifier means to individual ones of said plurality of amplitude modulators and to respective ones of said plurality of propagating means, a source of audio frequency signal information, a plurality of filter means for passing discrete portions of the audio spectrum, each of said filter means passing different portions and the sum of the portion passed by each containing sufficient frequencies in the audio spectrum to produce an intelligible signal, means connecting respective ones of said plurality of filter means individually to respective ones of said plurality of amplitude modulators and to said audio source, said plurality of filter means each having alternating pass bands, each of said pass bands being representative of an important group of frequencies in the audio spectrum.

5. In a single sideband transmission system, a source of audio frequency signal energy, a first and second transmission path connected to said source, a first and second attenuating means for attenuating different discrete frequencies in the audio spectrum, said first and second attenuating means being serially connected in said first and second transmission paths respectively, a first modulating means and means connecting said first modulating means to said first transmission path, a second modulating means and means connecting said second modulating means to said second transmission path, said first and second modulating means being adapted to modulate the output of the attenuating means on carrier signals of the same frequency, and a first and second transmission means geographically separated from one another, and means connecting said first and second transmission means to the first and second transmission paths respectively, for the transmission of the signal energy.

6. In a space diversity radio communication system comprising a plurality of transmission means for the transmission of signal energy, first means for generating a carrier signal, a plurality of amplitude modulators, means connecting said plurality of amplitude modulators respectively to individual ones of said plurality of transmission means, means connecting said first means to each of said amplitude modulators, a second means for generating signal information, a plurality of filter means for passing discrete portions of the frequency spectrum of said information signal, each of said filter means passing different portions and the sum of the portion passed by each containing sufficient frequencies in the spectrum to produce an intelligible signal, each of said plurality of filter means having many alternately staggered pass bands throughout the frequency spectrum of the signal generating means, the bands of the several filter means falling adjacent to one another through said spectrum, means connecting respective ones of the plurality of filter means individually to respective ones of said plurality of amplitude modulators and said signal generating means.

7. In a space diversity single sideband radio telephone transmission system having a first and a second antenna for the propagation of signal energy, means for generating a carrier signal, a first and a second amplitude modulator, means connecting said carrier generating means to each of said amplitude modulators, a first and second amplifier means for the amplification of a suppressed carrier single sideband amplitude modulated signal, means connecting said first and second amplifier means to said first and second amplitude modulators respectively, means further connecting said first and second amplifier means to said first and second antennas respectively, an audio frequency source of signal information, a first and second attenuating means having many attenuation and pass bands throughout the frequency spectrum of the audio frequency source, the attenuation bands of said first attenuating means coinciding with the pass bands of said second attenuating means, means connecting said first and second attenuating means to said first and second amplitude modulators respectively, and to the audio frequency source.

8. In a suppressed carrier single sideband communication system having a plurality of propagating means spacially displaced from one another, means for generating a carrier signal, a plurality of amplitude modulators, means connecting said carrier generating means to said plurality of amplitude modulators, means connecting respective ones of said plurality of amplitude modulators individually to different ones of said plurality of propagating means, an audio frequency source of signal information, a plurality of attenuating means, means connecting different ones of said plurality of attenuating means individually to respective ones of said plurality of amplitude modulators and to said audio source, each of said plurality of attenuating means having many alternate attenuation and pass-bands throughout the band of frequencies emitted by said audio source, said attenuation bands being relatively close together at the low frequencies and being further apart for the higher frequencies.

9. In a space diversity single sideband radio telephone transmission system having a first and a second antenna for the propagation of signal energy, means for generating a carrier signal, a first and a second amplitude modulator, means connecting said carrier generating means to each of said amplitude modulators, a first and second amplifier means for the amplification of a suppressed carrier single sideband amplitude modulated signal, means connecting said first and second amplifier means to said first and second amplitude modulators, respectively, means further connecting said first and second amplifier means to said first and second antennas respectively, an audio frequency source of signal information, a first and second attenuating means having many attenuation and pass bands throughout the frequency spectrum of the audio frequency source, the attenuation bands of the first attenuating means being noncoincident with the attenuation bands of the second attenuating means, a predetermined portion of the pass bands of said first attenuating means coinciding with the pass bands of said second attenuating means, and means connecting said first and second attenuating means to said first and second amplitude modulators respectively, and to the audio frequency source.

References Cited in the file of this patent

UNITED STATES PATENTS 1,836,129 Potter ---------------- Dec. 15, 1931